United States Patent
Kang (10) Patent No.: US 11,400,879 B2
(45) Date of Patent: Aug. 2, 2022

(54) AIRBAG SUPPORT DEVICE FOR VEHICLE SWIVEL SEAT

(71) Applicants: HYUNDAI MOTOR COMPANY, Seoul (KR); KIA MOTORS CORPORATION, Seoul (KR)

(72) Inventor: Seung Kyu Kang, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/219,229

(22) Filed: Mar. 31, 2021

(65) Prior Publication Data

US 2022/0073025 A1    Mar. 10, 2022

(30) Foreign Application Priority Data

Sep. 9, 2020 (KR) .................. 10-2020-0115074

(51) Int. Cl.
| | |
|---|---|
| *B60R 21/207* | (2006.01) |
| *B60R 21/2334* | (2011.01) |
| *B60R 21/231* | (2011.01) |
| *B60N 2/68* | (2006.01) |
| *B60N 2/02* | (2006.01) |

(52) U.S. Cl.
CPC ........ *B60R 21/207* (2013.01); *B60R 21/2334* (2013.01); *B60R 21/23138* (2013.01); *B60N 2/68* (2013.01); *B60N 2002/022* (2013.01); *B60R 2021/23146* (2013.01)

(58) Field of Classification Search
None
See application file for complete search history.

(56) References Cited

U.S. PATENT DOCUMENTS

| | | | |
|---|---|---|---|
| 9,238,425 B2* | 1/2016 | Fukawatase | B60N 2/4235 |
| 9,751,491 B2 | 9/2017 | Sugimura et al. | |
| 9,919,673 B2 | 3/2018 | Ohno et al. | |
| 10,513,206 B2 | 12/2019 | Spahn et al. | |
| 10,625,704 B2 | 4/2020 | Dry et al. | |
| 10,632,952 B2* | 4/2020 | Markusic | B60R 21/231 |
| 10,926,733 B2* | 2/2021 | Dry | B60R 21/23138 |
| 2019/0275974 A1 | 9/2019 | Yetukuri et al. | |
| 2019/0275979 A1 | 9/2019 | Dry et al. | |

FOREIGN PATENT DOCUMENTS

JP     2013-237295 A     11/2013

* cited by examiner

*Primary Examiner* — Faye M Fleming
(74) *Attorney, Agent, or Firm* — Morgan, Lewis & Bockius LLP (57) ABSTRACT

An airbag support device for a vehicle swivel seat includes: a support frame disposed on a lateral side of a seat back frame; a side airbag disposed on a rear plate of the support frame; a plurality of support bars disposed in an extendable manner on a lateral plate of the support frame; an extension drive bar configured to extend such that the extension drive bar connects the plurality of support bars to each other while extending; and a support bar extension drive assembly, connected to the rear plate of the support frame and the extension drive bar, wherein the support bar extension drive assembly is configured to push the extension drive bar inward and outward and at the same time to extend the support bar when the side airbag is inflated.

11 Claims, 9 Drawing Sheets

AIRBAG SUPPORT DEVICE FOR VEHICLE SWIVEL SEAT

CROSS REFERENCE TO RELATED APPLICATION

The present application claims priority to the benefit of Korean Patent Application No. 10-2020-0115074, filed on Sep. 9, 2020 in the Korean Intellectual Property Office, the entire contents of which is incorporated herein for all purposes by this reference.

TECHNICAL FIELD

The present disclosure relates to an airbag support device for a vehicle swivel seat. More particularly, the present disclosure relates to an airbag support device for a vehicle swivel seat, which is capable of supporting an airbag for the vehicle swivel seat mounted on an autonomous traveling vehicle when the airbag therefor is inflated.

BACKGROUND

Research and development has been conducted to apply various mechanisms for conversations and meetings among occupants, relaxation and sleeping, assistance in getting in and out of a vehicle, and the like to seats for autonomous traveling vehicles.

As an example, swivel seats have been developed that are rotatable to an angle of 180° or wider in a desired direction for multi-party conversations and meetings, scenery seeing, assistance in getting in and out of a vehicle, and the like.

Accordingly, when adjusted to a rotation angle desired by an occupant, the swivel seat can be positioned in the same direction as a vehicle travels or can be positioned in a direction opposite to a traveling direction of the vehicle. Alternatively, the swivel seat can be positioned perpendicularly or obliquely with respect to a lengthwise direction of a vehicle frame.

In addition, to protect against lateral collision, a side airbag (SAB) is mounted into a lateral side portion of a seat back of the swivel seat.

Accordingly, in a state where the swivel seat is positioned in the same direction as the vehicle travels, when the airbag mounted into the lateral side portion of the seat back is inflated due to the lateral collision, the external surface of the airbag can be supported on a door trim or the like. Thus, an occupant can be cushioned and protected by an internal surface of the airbag.

However, in a state where the swivel seat is swiveled and thus is positioned obliquely with respect to the lengthwise direction of the vehicle frame, when the lateral collision occurs, the airbag mounted into the lateral side portion of the seat back is inflated. At this point, due to the absence of a separate support device, the occupant is brought into contact with the internal surface of the airbag and at the same time is pushed outward. Thus, the occupant is much less cushioned by the airbag, thereby increasing the likelihood that the occupant will be injured.

The foregoing is intended merely to aid in the understanding of the background of the present disclosure, and is not intended to mean that the present disclosure falls within the purview of the related art that is already known to those skilled in the art.

SUMMARY

An objective of the present disclosure is to provide an airbag support device for a vehicle swivel seat, in which, in a state where a swivel seat is swiveled to a predetermined angle, when lateral collision occurs, an airbag mounted into a lateral side portion of a seat back is inflated and at the same time a plurality of support bars are extended, thereby supporting an external surface of the airbag. With the airbag support device, in a state where the external surface of the airbag is supported on the plurality of support bars, an occupant is brought into contact with the external surface of the airbag and is readily cushioned and protected.

According to an aspect of the present disclosure, there is provided an airbag support device for a swivel seat of a vehicle, the device including: a support frame disposed on a lateral side of a seat back frame, wherein the support frame comprises a rear plate at a rear side thereof and a lateral plate at a lateral side thereof, the rear plate and the lateral plate configured to be integrally connected to each other; a plurality of support bars disposed in an extendable manner on a lateral plate of the support frame; an extension drive bar configured to extend such that the extension drive bar connects the plurality of support bars to each other while extending; and a support bar extension drive assembly connected to the rear plate of the support frame and the extension drive bar, wherein the support bar extension drive assembly is configured to push the extension drive bar inward and outward and at the same time to extend the support bar when the side airbag is inflated.

In the airbag support device, the lateral plate-shape portion of the support frame may have a support bar riveting hole therein and the rear plate of the support frame may have an inflator insertion hole and a mounting hole therein.

In the airbag support device, the plurality of support bars, each having a hinge structure that allows folding in two or more steps, may be arranged at an equal distance along an upward-downward direction on the lateral plate of the support frame.

In the airbag support device, the support bar may include a (1-1)-set support bar and a (1-2)-st support bar, rear end portions of which are connected by a hinge mechanism to the lateral plate of the support frame; and a (2-1)-nd support bar and a (2-2)-nd support bar, which are connected by the hinge mechanism to front end portions, respectively, of the (1-1)-st support bar and the (1-2)-st support bar, and are thus positioned to intersect each other, and the extension drive bar may be connected by the hinge mechanism to portions, brought into contact with each other in an intersecting manner, of the (2-1)-nd support bar and the (2-2)-nd support bar.

In the airbag support device, a (3-1)-rd support bar and a (3-2)-rd support bar may be additionally connected to front end portions, respectively, of the (2-1)-nd support bar and the (2-2)-nd support bar, and if necessary, a (4-1)-th support bar and a (4-2)-nd support bar may be additionally connected to front end portions, respectively, of the (3-1)-rd support bar and the (3-2)-rd support bar.

In the airbag support device, the support bar extension drive assembly may include an inflator mounted on the rear plate of the support frame; a guide cylinder having a guide slit along a lengthwise direction in a surface thereof, a rear end portion of the guide cylinder being connected to a front end portion of the inflator; and a guide bar including: a piston inserted into the guide cylinder; a connection bar mounted on the extension drive bar; and a neck both ends of which are connected integrally to the piston and the connection bar, respectively, and which is positioned into the guide slit.

In the airbag support device, a mounting bracket may be provided between the inflator and the guide cylinder, the mounting bracket being inserted into a mounting hole in the rear plate of the support frame.

In the airbag support device, a stopper for preventing the guide bar from moving out of the guide cylinder may be mounted on a front end portion of the guide cylinder.

In the airbag support device, when a condition for inflating the side airbag and a condition that the vehicle swivel seat is swiveled to a predetermined angle or wider are satisfied at the same time, with a signal of an airbag control unit, the inflator may perform an inflation operation and at the same time the side airbag may be inflated.

In the airbag support device, when the vehicle swivel seat is positioned in the same direction as a vehicle travels and thus a swivel condition is not satisfied, with the signal of the airbag control unit, only the side airbag may be inflated.

The airbag support device according to the present disclosure provides the following advantages.

Firstly, in a state where the swivel seat is swiveled, when lateral collision occurs, an airbag mounted into a lateral side portion of a seat back is inflated and at the same time as a plurality of support bars are extended. Thus, the plurality of support bars can serve as a blocking wall supporting the external surface of the airbag.

Secondly, since the plurality of support bars serve as the blocking wall supporting the external surface of the airbag, even when an occupant is brought into contact with the internal surface of the airbag, the airbag is not pushed outward. Accordingly, when brought into contact with the internal surface of the airbag, the occupant can be readily cushioned and protected.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Exemplary embodiments of the present disclosure will be described in detail below with reference to the accompanying drawings.

Figure 1:
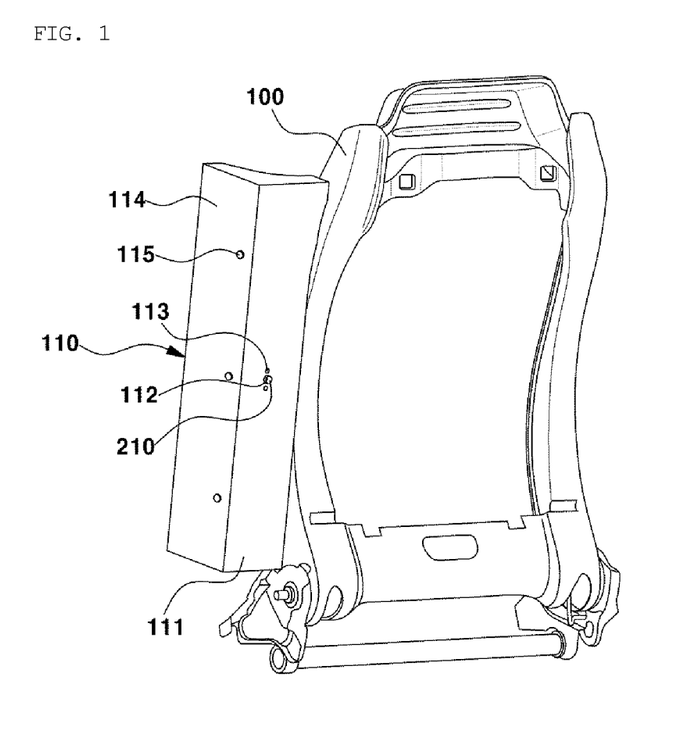
FIGS. 1 and 2 are perspective views each illustrating an airbag support device for a vehicle swivel seat according to an exemplary embodiment of the present disclosure.
Figure 2:
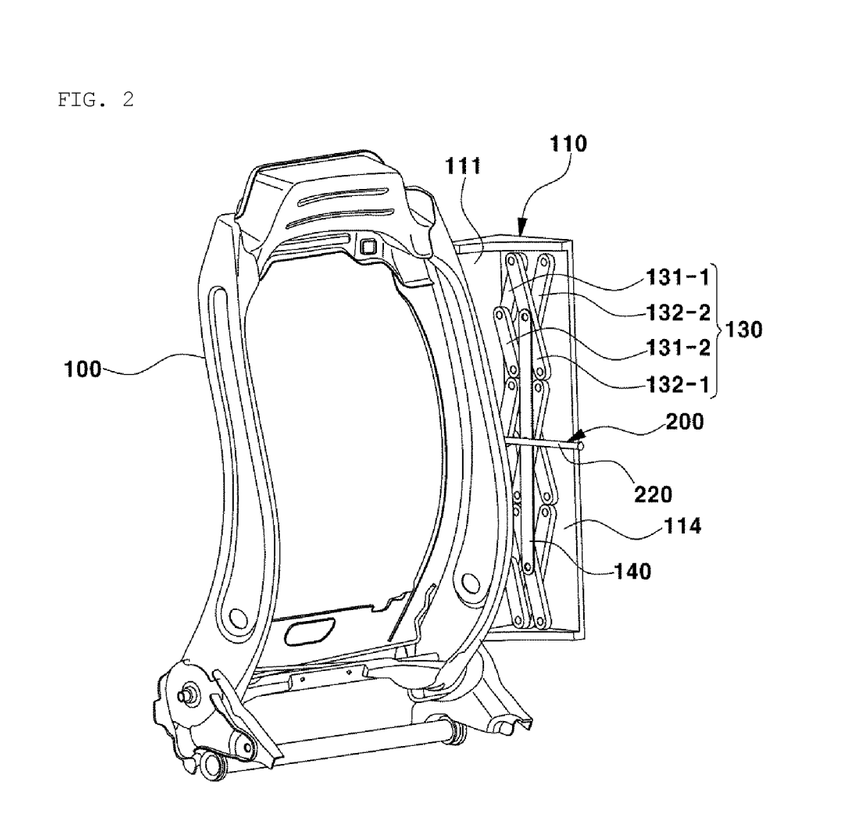
Figure 3:
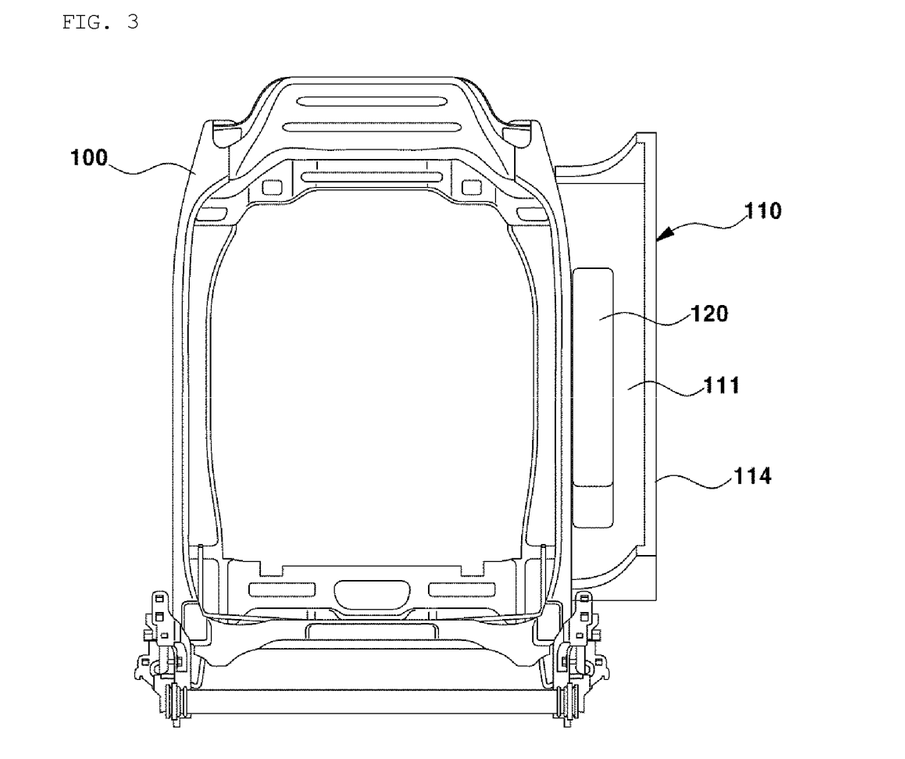
FIG. 3 is a front view illustrating a state where a side airbag is mounted on the vehicle swivel seat according to an exemplary embodiment of the present disclosure.

FIGS. 1 and 2 are perspective views illustrating an airbag support device for a vehicle swivel seat according to the present disclosure. FIG. 3 is a front view illustrating a state where a side airbag is mounted on the vehicle swivel seat according to the present disclosure.

As illustrated in FIGS. 1 to 3, a support frame 110, open at a front face thereof, is mounted on a lateral portion of a seat back frame 100.

A rear plate 111 of the support frame 110 has an inflator insertion hole 112 and a mounting hole 113 therein. A lateral plate 114 of the support frame 110 has a support bar riveting hole 115 therein.

As illustrated in FIG. 3, a side airbag 120 is mounted on the rear plate 111 of the support frame 110.

As illustrated in FIG. 2, a plurality of support bars 130 are mounted at an equal distance along an upward-downward direction on the lateral plate 114 of the support frame 110.

The plurality of support bars 130 each have a hinge structure that allows folding in two or more steps. The plurality of support bars 130 are arranged on the lateral plate 114 of the support frame 110 in a manner that is extendable forward at an equal distance along the upward-downward direction.

Figure 4:
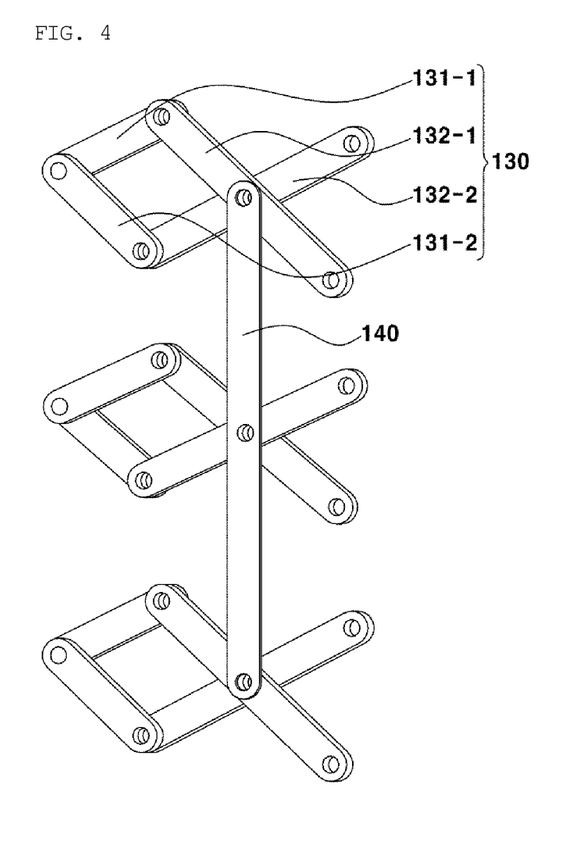
FIG. 4 is a perspective view illustrating an example of a foldable support bar of the airbag support device for the vehicle swivel seat according to an exemplary embodiment of the present disclosure.

To this end, as illustrated in FIG. 4, the plurality of support bars 130 each include a (1-1)-st support bar 131-1, a (1-2)-st support bar 131-2, a (2-1)-nd support bar 132-1, and a (2-2)-nd support bar 132-2. Rear end portions of the (1-1)-st support bar 131-1 and the (1-2)-st support bar 131-2 are by a hinge mechanism to the lateral plate 114 of the support frame 110. The (2-1)-nd support bar 132-1 and the (2-2)-nd support bar 132-2 are connected by the hinge mechanism to front end portions, respectively, of the (1-1)-st support bar 131-1 and the (1-2)-st support bar 131-2, and are thus positioned to intersect each other.

Figure 10:
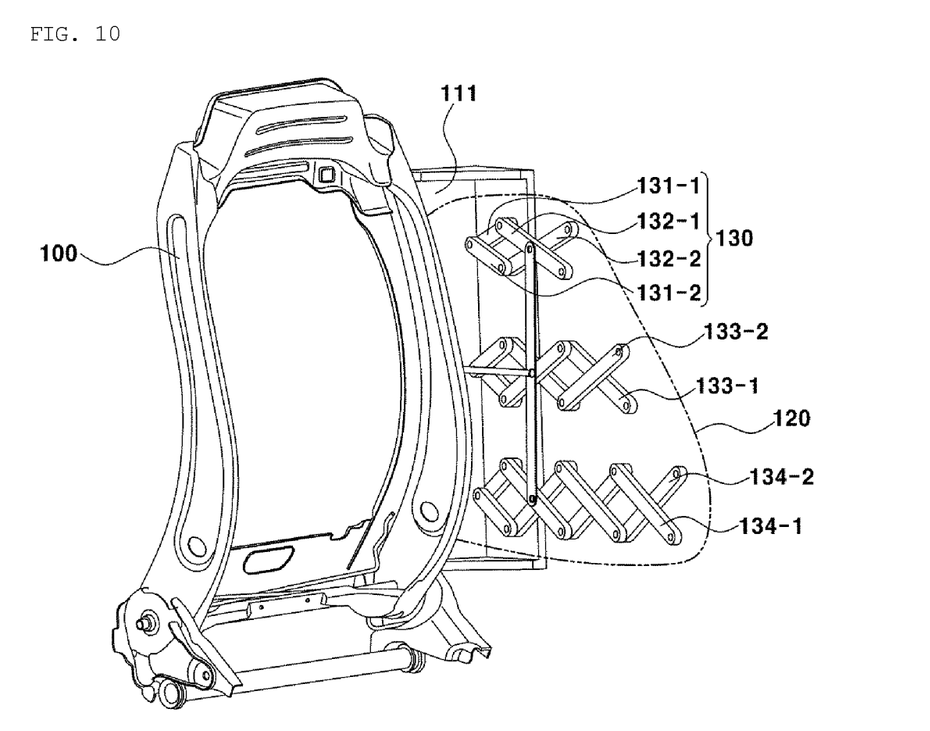

As illustrated in FIG. 10, in a case where there is a need to increase an area for supporting the side airbag 120, a (3-1)-rd support bar 133-1 and a (3-2)-rd support bar 133-2 are additionally connected to front end portions, respectively, of the (2-1)-nd support bar 132-1 and the (2-2)-nd support bar 132-2, and a (4-1)-th support bar 134-1 and a (4-2)-th support bar 134-2 are additionally connected to front end portions, respectively, of the (3-1)-rd support bar 133-1 and the (3-2)-rd support bar 133-2.

The support bar 130, provided as described above, is expanded by an extension drive bar 140 of which a position is changed by a support bar extension drive assembly 200.

To this end, the extension drive bar 140 takes the shape of a bar extending to a predetermined length in the upward-downward direction. As illustrated in FIG. 4, the extension drive bar 140 is connected by the hinge mechanism to portions, brought into contact with each other in an intersecting manner, of the (2-1)-nd support bar 132-1 and the (2-2)-nd support bar 132-2 that constitute the support bar 130.

Accordingly, the extension drive bar 140 connects the plurality of support bars 130 together in a manner that is extendable at the same time.

At this point, the support bar extension drive assembly 200 is connected to the rear plate 111 of the support frame 110 and the extension drive bar 140. The support bar extension assembly 200 pushes the extension drive bar 140 and at the same time extends the support bar 130 when the side airbag 120 is inflated.

Figure 5:
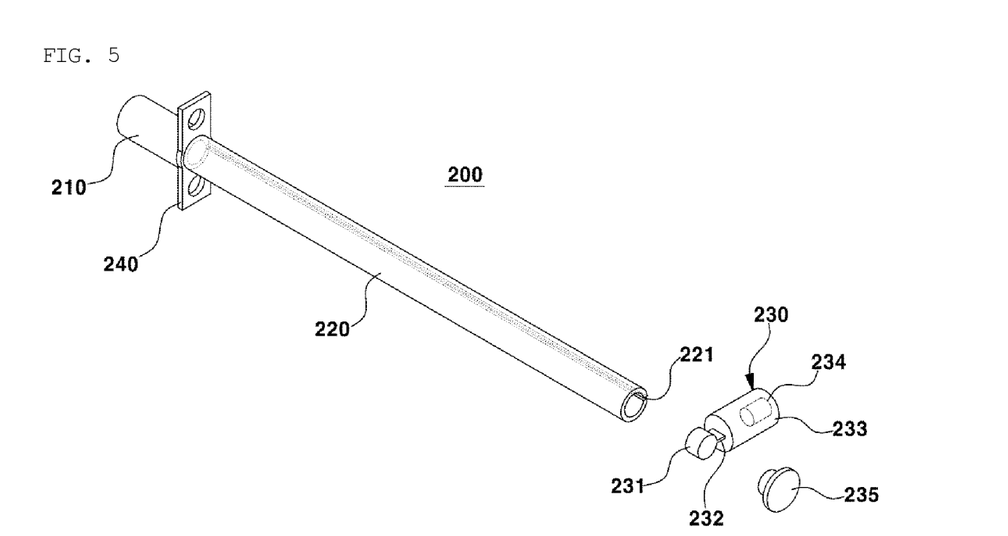
FIG. 5 is a perspective view illustrating a support bar extension drive assembly of the airbag support device for the vehicle swivel seat according to an exemplary embodiment of the present disclosure.
Figure 6:
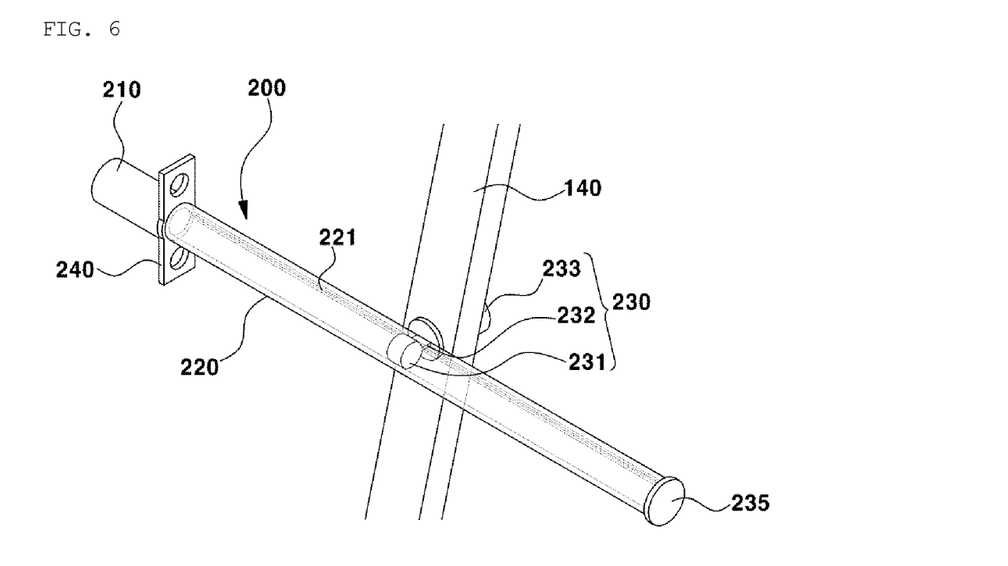
FIG. 6 is a perspective view illustrating a state where the support bar extension drive assembly of the airbag support device for the vehicle swivel seat according to an exemplary embodiment of the present disclosure is fastened to an extension drive bar.
Figure 7:
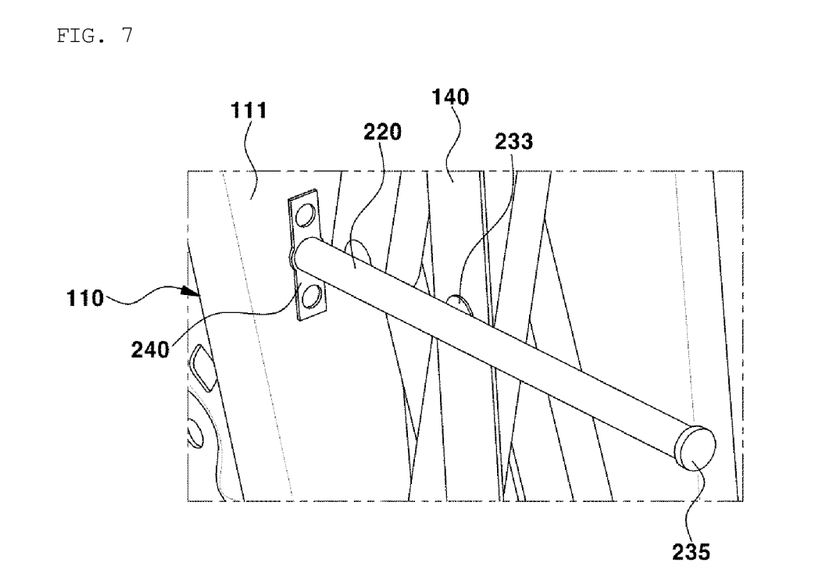
FIG. 7 is a perspective view illustrating a state where the support bar extension drive assembly of the airbag support device for the vehicle swivel seat according to an exemplary embodiment of the present disclosure is connected to a support frame and the extension drive bar.

FIG. 5 is a perspective exploded view illustrating the support bar extension drive assembly according to the present disclosure. FIGS. 6 and 7 are perspective views each illustrating a state where the support bar extension drive assembly is assembled.

As illustrated in FIG. 5, the support bar extension drive assembly 200 includes an inflator 210, a guide cylinder 220, and a guide bar 230. The inflator 210 is mounted on the rear plate 111 of the support frame 110. The guide cylinder 220 is connected to a front end portion of the inflator 210. The guide bar 230 is fastened to the guide cylinder 220 in a manner that is movable backward and forward.

The guide cylinder 220, which is pipe-shaped, has a guide slit 221 along a lengthwise direction in a surface thereof. A rear end portion of the guide cylinder 220 is connected to a front end portion of the inflator 210.

The guide bar 230 includes a piston 231, a connection bar 233, and a neck 232. The piston 231 is inserted into the guide cylinder 220. The connection bar 233 is mounted on the extension drive bar 140. The neck 232, both ends of which are connected integrally to the piston 231 and the connection bar 233, respectively, is positioned into the guide slit 221.

The connection bar 233 may have a bolt fastening groove 234 in a rear plate thereof. The bolt fastening groove 234 is for fastening the extension drive bar 140.

Accordingly, the piston 231 of the guide bar 230 is inserted into the guide cylinder 220 in a manner that enables the neck 232 to move along the guide slit 221.

Then, a stopper 235 for preventing the piston 231 of the guide bar 230 from moving out of the guide cylinder 220 is mounted on a front end portion of the guide cylinder 220.

In addition, as illustrated in FIG. 6, in order to fix the guide bar 230 to the extension drive bar 140, the connection bar 233 of the guide bar 230 is brought into contact with a middle portion, in the upward-downward direction, of the extension drive bar 140, and then a bolt is screwed from behind the extension drive bar 140 into the bolt fastening groove 234 in the connection bar 233.

In addition, as illustrated in FIG. 7, a mounting bracket 240 is provided between the inflator 210 and the guide cylinder 220. The mounting bracket 240 is inserted into the mounting hole 113 in the rear plate 111 of the support frame 110. Thus, the inflator 210 and the guide cylinder 220 are firmly fixed to the support frame 110 in a supported manner.

The inflator 210 includes gunpowder inside. When performing the inflation operation, the inflator 210 generates gas. The inflator 210 performs the inflation operation only in a case where a condition for inflating the side airbag 120 and a condition that the vehicle swivel seat is swiveled to a predetermined angle or wider are satisfied at the same time.

That is, an airbag control unit (ACU), which is a controller, determines whether or not the condition for inflating the side airbag 120 and the condition that the vehicle swivel seat is swiveled to a predetermined angle or wider are satisfied at the same time. Then, in a case where it is determined that the two conditions are satisfied at the same time, the inflator 210 performs the inflation operation with a control signal of the airbag control unit. Here, the ACU may be a computer or processor such as a CPU, or may be embedded in an electronic control unit of a vehicle. Further, the ACU may include or communicate with various sensors such as acceleration sensors and speed sensors.

A flow for operation of the airbag support device configured as described above will be described below.

Figure 8:
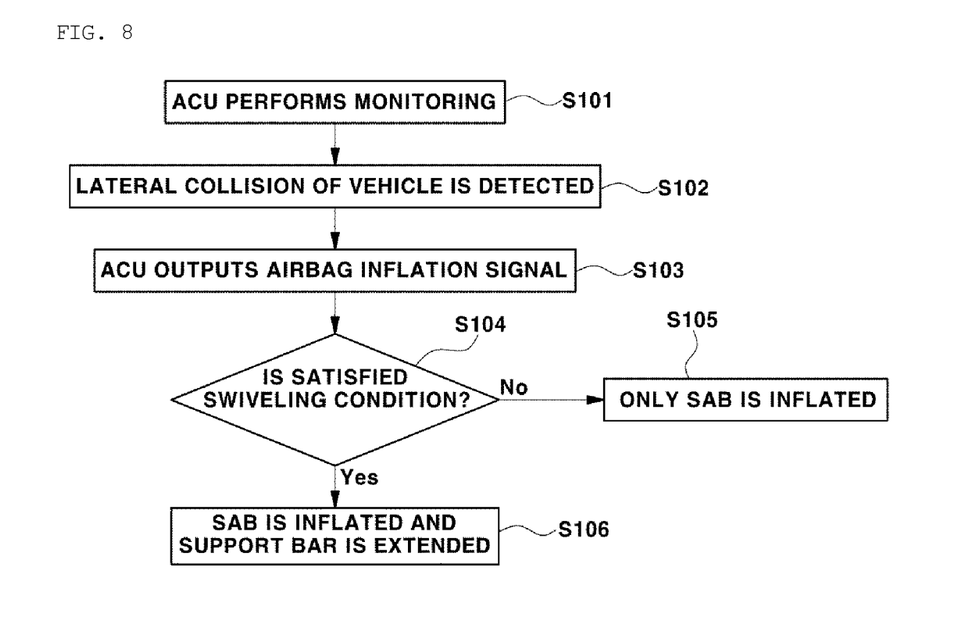
FIG. 8 is a flowchart illustrating operation of the airbag support device for the vehicle swivel seat according to an exemplary embodiment of the present disclosure.
Figure 9:
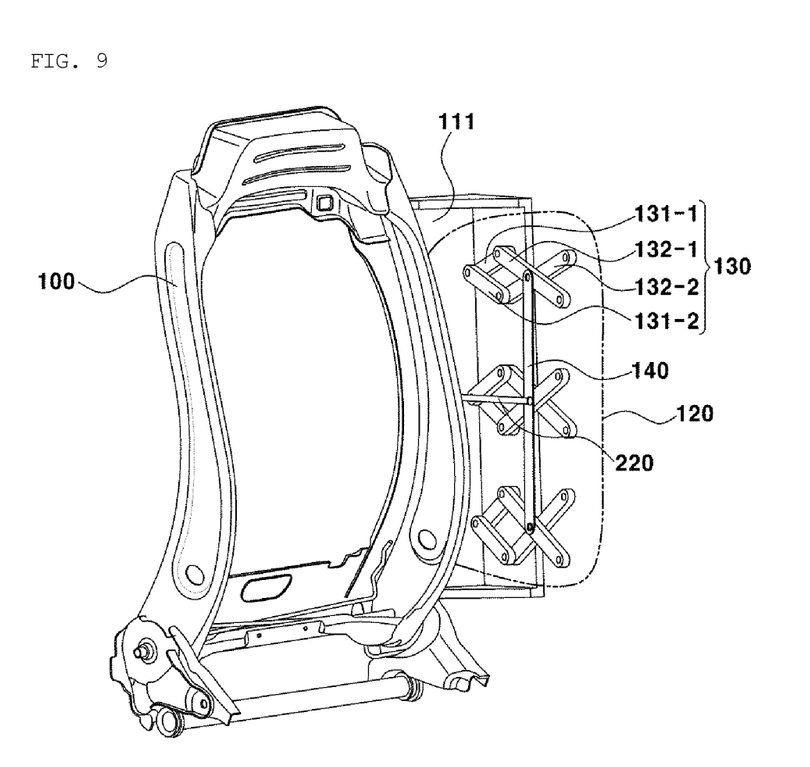
FIGS. 9 and 10 are perspective views each illustrating a state where the foldable support bar of the airbag support device for the vehicle swivel seat according to an exemplary embodiment of the present disclosure is extended at the same time as the side airbag is inflated.

FIG. 8 is a flowchart illustrating the operation of the airbag support device for the vehicle swivel seat according to the present disclosure. FIGS. 9 and 10 are perspective views each illustrating a state where a foldable support bar of the airbag support device for the vehicle swivel seat is extended at the same time as the side airbag is inflated.

As illustrated in FIG. 8, the airbag control unit (ACU) performs monitoring (S101), and when lateral collision of a vehicle is detected (S102), the airbag control unit outputs an airbag inflation signal (S103).

At this point, before actually outputting the airbag inflation signal to the side airbag 120, the airbag control unit determines whether or not the vehicle swivel seat currently satisfies a swiveling condition (S104).

For example, the airbag control unit receives a detection signal of a resolution angle detection sensor mounted on a swivel shaft of the vehicle swivel seat and determines whether the vehicle swivel seat is positioned in the same direction as the vehicle travels or is positioned obliquely with respect to a lengthwise direction of a vehicle frame.

When it is determined that the vehicle swivel seat is positioned in the same direction as the vehicle travels and that the swiveling condition is thus not satisfied, the airbag control unit applies a control signal for extension only to the side airbag.

Accordingly, as described above, only the side airbag 120 mounted on the rear plate 111 of the support frame 110 is inflated forward (S105).

At this point, the external surface of the airbag inflated as described above can be supported on a door trim or the like. Therefore, even when an impact brings an occupant into contact with the airbag, the airbag is not pushed outward. Thus, the occupant can be readily cushioned and protected by the airbag.

When it is determined in Step S104 that the vehicle swivel seat is positioned obliquely with respect to the lengthwise direction of the vehicle frame and that the swivel condition is thus satisfied, the airbag control unit applies control signals for inflation and explosion to the side airbag 120 and the inflator 210, respectively, at the same time. Thus, the side airbag 120 and the inflator 210 operate at the same time (S106).

Accordingly, with a gas pressure resulting from the explosion of the inflator 210, the piston 231 of the guide bar 230 inserted into the guide cylinder 220 is moved forward, and at the same time, the neck 232 integrally combined with the piston 231 is moved forward along the guide slit 221. Thus, the connection bar 233 integrally combined with the neck 232 is moved forward, thereby pushing forward the extension drive bar 140.

Therefore, as illustrated in FIGS. 9 and 10, the extension drive 140 is moved forward at the same time as the side airbag 120 is inflated, and thus the plurality of support bars 130 each are extended forward.

Accordingly, when a state where the vehicle swivel seat according to the present disclosure is swiveled is reached (for example, in a case where the vehicle swivel seat is positioned obliquely with respect to the lengthwise direction of the vehicle frame), that is, when the lateral collision occurs, the plurality of support bars 130 are extended at the same time as the side airbag 120 mounted into a lateral side portion of a seat back is inflated, and thus serve as a blocking wall supporting the external surface of the side airbag 120. As a result, the airbag is not pushed outward even when due to the impact, the occupant is brought into contact with an internal surface of the airbag. As a result, the occupant is brought into contact with the internal surface of the airbag. Thus, the occupant can be readily cushioned and protected.

An area for supporting the side airbag may be determined by an area where the side airbag is inflated, and the more the area for supporting the side airbag is increased, the more support bars 130 are employed. As illustrated in FIG. 10, in order to increase the area for supporting the side airbag 120, the (3-1)-rd support bar 133-1 and the (3-2)-rd support bar 133-2 may be additionally connected to front end portions, respectively, of the (2-1)-nd support bar 132-1 and the (2-2)-nd support bar 132-2, and the (4-1)-th support bar 134-1 and the (4-2)-th support bar 134-2 may be additionally connected to front end portions, respectively, of the (3-1)-rd support bar 133-1 and the (3-2)-rd support bar 133-2.

Figure 11:
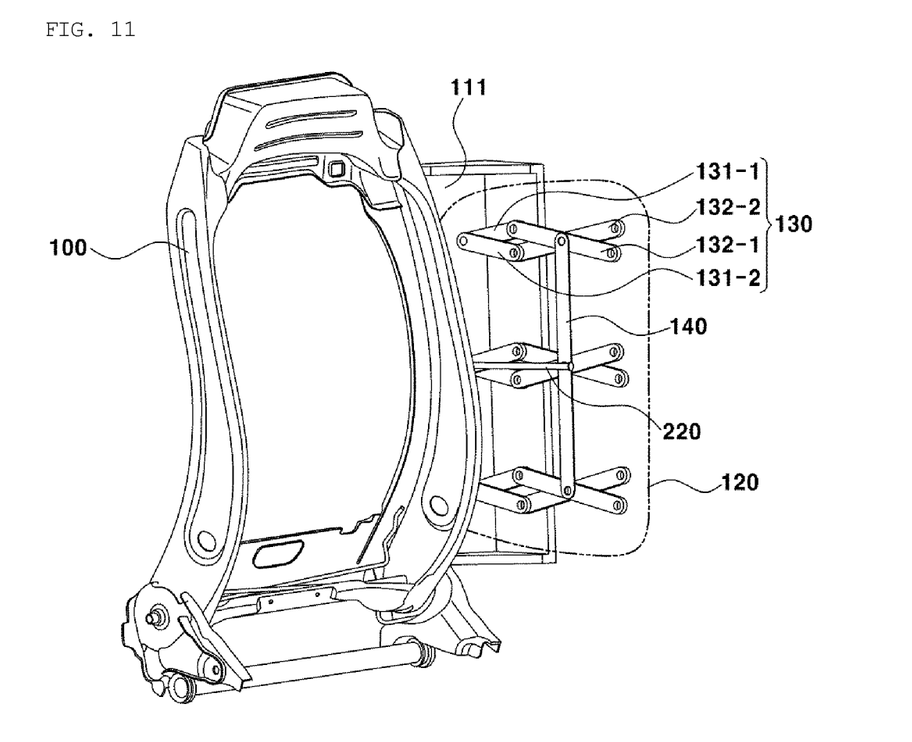
FIG. 11 is a perspective view illustrating an example where a length of a guide cylinder of the airbag support device for the vehicle swivel seat according to an exemplary embodiment of the present disclosure is increased.

In addition, as illustrated in FIG. 11, a further increase in a length of the guide cylinder 220 can increase a distance by which the guide bar 230 is moved forward and a distance by which the extension drive bar 140 is moved forward, thereby further increasing a distance that each of the support bars 130 connected to the extension drive bar 140 is extended. Thus, a position and a shape of the blocking wall supporting the side airbag can be changed.

Although the specific embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. An airbag support device for a swivel seat of a vehicle, the device comprising:
    a support frame disposed on a lateral side of a seat back frame, wherein the support frame comprises a rear plate at a rear side thereof and a lateral plate at a lateral side thereof, the rear plate and the lateral plate configured to be integrally connected to each other;
    a side airbag disposed on the rear plate of the support frame;
    a plurality of support bars disposed in an extendable manner on a lateral plate of the support frame;
    an extension drive bar configured to extend such that the extension drive bar connects the plurality of support bars to each other while extending; and
    a support bar extension drive assembly connected to the rear plate of the support frame and the extension drive bar, wherein the support bar extension drive assembly is configured to push the extension drive bar inward and outward and at the same time to extend the support bar when the side airbag is inflated.

2. The airbag support device of claim 1, wherein the support frame has a support bar riveting hole on the lateral plate of the support frame.

3. The airbag support device of claim 1, wherein the support frame has an inflator insertion hole and a mounting hole on the rear plate of the support frame.

4. The airbag support device of claim 1, wherein the plurality of support bars, each having a hinge structure that allows folding in two or more steps, are arranged at an equal distance along an upward-downward direction on the lateral plate of the support frame.

5. The airbag support device of claim 4, wherein the support bar comprises:
    a (1-1)-st support bar and a (1-2)-st support bar, rear end portions of which are hingedly connected to the lateral plate of the support frame; and
    a (2-1)-nd support bar and a (2-2)-nd support bar, which are hingedly connected to front end portions, respectively, of the (1-1)-st support bar and the (1-2)-st support bar, and disposed to intersect each other, and
    the extension drive bar is hingedly connected to intersecting portions of the (2-1)-nd support bar and the (2-2)-nd support bar.

6. The airbag support device of claim 5, wherein at least one of:
    a (3-1)-rd support bar and a (3-2)-rd support bar are connected to front end portions, respectively, of the (2-1)-nd support bar and the (2-2)-nd support bar, or
    a (4-1)-th support bar and a (4-2)-nd support bar are connected to front end portions, respectively, of the (3-1)-rd support bar and the (3-2)-rd support bar.

7. The airbag support device of claim 1, wherein the support bar extension drive assembly comprises:
    an inflator disposed on the rear plate of the support frame;
    a guide cylinder having a guide slit along a lengthwise direction in a surface of the guide cylinder, a rear end portion of the guide cylinder being connected to a front end portion of the inflator; and
    a guide bar comprising:
        a piston disposed in the guide cylinder;
        a connection bar disposed on the extension drive bar; and
        a neck, both ends of which are configured to be integrally connected to the piston and the connection bar, respectively, wherein the neck is disposed in the guide slit.

8. The airbag support device of claim 7, further comprising a mounting bracket disposed between the inflator and the guide cylinder, the mounting bracket disposed in a mounting hole on the rear plate of the support frame.

9. The airbag support device of claim 7, further comprising a stopper disposed on a front end portion of the guide cylinder and configured to prevent the guide bar from moving out of the guide cylinder.

10. The airbag support device of claim 7, wherein, when a condition for inflating the side airbag and a condition that the swivel seat is swiveled to a predetermined angle or wider are satisfied at the same time, with a signal of an airbag control unit, the inflator performs an inflation operation of generating gas while the side airbag is inflated.

11. The airbag support device of claim 10, wherein, when the swivel seat is positioned in the same direction as the vehicle travels and a swivel condition is not satisfied, with the signal of the airbag control unit, only the side airbag is inflated.

* * * * *